(12) United States Patent
Määttä et al.

(10) Patent No.: US 10,488,882 B2
(45) Date of Patent: Nov. 26, 2019

(54) ELECTRONIC DEVICE HINGE ASSEMBLY

(71) Applicant: Microsoft Technology Licensing, LLC, Redmond, WA (US)

(72) Inventors: Esa-Sakari Määttä, Helsinki (FI); Pasi Kemppinen, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

(21) Appl. No.: 15/256,496

(22) Filed: Sep. 2, 2016

(65) Prior Publication Data
US 2018/0067520 A1   Mar. 8, 2018

(51) Int. Cl.
*G06F 1/16* (2006.01)

(52) U.S. Cl.
CPC .......... *G06F 1/1616* (2013.01); *G06F 1/1681* (2013.01); *Y10T 16/541* (2015.01)

(58) Field of Classification Search
CPC ....... G06F 1/1616; G06F 1/1681; E05D 3/06; E05D 3/122; H04M 1/022; H05K 5/0226; E05Y 2900/606; Y10T 16/547; Y10T 16/541
USPC .......... 16/354, 366; 379/433.13; 361/679.27; 455/575.3
See application file for complete search history.

(56) References Cited

U.S. PATENT DOCUMENTS

| | | | | |
|---|---|---|---|---|
| 5,987,704 A * | 11/1999 | Tang | ...................... | G06F 1/1681 16/342 |
| 6,519,812 B2 * | 2/2003 | Ko | ...................... | H04N 5/2251 16/248 |
| 7,627,337 B2 | 12/2009 | Maatta et al. | | |
| 7,900,323 B2 * | 3/2011 | Lin | ...................... | F21S 6/003 16/254 |
| 8,205,305 B2 * | 6/2012 | Wang | ...................... | G06F 1/1681 16/354 |
| 8,312,596 B2 * | 11/2012 | Self | ...................... | A47K 3/36 16/250 |
| 8,474,101 B2 * | 7/2013 | Wang | ...................... | G06F 1/1681 16/354 |
| 8,938,856 B1 * | 1/2015 | Shin | ...................... | E05D 3/06 16/365 |
| 10,019,039 B1 * | 7/2018 | Hsu | ...................... | G06F 1/1681 |
| 2008/0232043 A1 | 9/2008 | Wang | | |
| 2008/0307608 A1 * | 12/2008 | Goto | ...................... | G06F 1/1618 16/366 |
| 2012/0039028 A1 | 2/2012 | Choo et al. | | |

(Continued)

OTHER PUBLICATIONS

Jackson, Jerry, "HP's Sexy New Pavilion x360 Convertible Challenges Lenovo's Yoga", Published on: Feb. 24, 2014, 1 page, Available at: http://www.notebookreview.com/news/hps-sexy-new-pavilion-x360-convertible-challenges-lenovos-yoga/.

*Primary Examiner* — William L Miller

(57) ABSTRACT

A hinge assembly for an electronic device comprises a first gear rotatable about a first axis of the hinge assembly and a second gear, rotatable about a second axis of the hinge assembly. A hinge housing holds the first gear in engagement with the second gear. A first hinge mounting element is configured to be movably fixed to a first leaf of the electronic device and a second hinge mounting element is configured to be movably fixed to a second leaf of the electronic device. A first pair of levers connects the first gear and the first hinge mounting element; and a second pair of levers connects the second gear and the second hinge mounting element.

20 Claims, 18 Drawing Sheets

(56) References Cited

U.S. PATENT DOCUMENTS

| | | |
|---|---|---|
| 2012/0120618 A1 | 5/2012 | Bohn |
| 2014/0223694 A1 | 8/2014 | Hsu |
| 2014/0360296 A1* | 12/2014 | Hsu ..................... G06F 1/1616 74/98 |
| 2015/0007416 A1 | 1/2015 | Chen |
| 2015/0185788 A1 | 7/2015 | Matsuoka |
| 2015/0362956 A1 | 12/2015 | Tazbaz |
| 2016/0070310 A1 | 3/2016 | Holung et al. |
| 2016/0123054 A1 | 5/2016 | Senatori |
| 2016/0187934 A1 | 6/2016 | Lee et al. |
| 2017/0357294 A1* | 12/2017 | Siddiqui ............... G06F 1/1616 |
| 2018/0067520 A1* | 3/2018 | Maatta ................. G06F 1/1681 |

* cited by examiner

ELECTRONIC DEVICE HINGE ASSEMBLY

BACKGROUND

Electronic computing devices are increasingly available as portable and/or hand held devices and as a result there is a limit on size and weight of such electronic devices. In addition, users desire to operate such portable and/or hand held electronic devices in a variety of use scenarios. For example, when sitting at a desk or table, when balancing the device on the lap or knee or when holding the device in the hand. Also, such computing devices are used for a variety of different tasks, such as viewing content, authoring documents, facilitating communication with others and other tasks. As a result there is a desire to enable electronic devices to be configurable in a variety of different modes or configurations suited to different use scenarios and different tasks. For example, where an electronic device with two leaves (such as a lid and a base, or two display screens) hinged together is able to open as a book opens and in addition, to lie flat in an open configuration on a table, as well as to be closed as a book is closed, or to be "closed" in a configuration as if the front and back covers of a book are touching.

For example, laptop computing devices with a lid comprising a display and a base comprising a keyboard are known, where the lid and base are connected by a hinge arrangement. In some existing configurations, hinge arrangements are limited in that the lid is unable to be configured 180 degrees from the base, or more than 180 degrees from the base.

The embodiments described below are not limited to implementations which solve any or all of the disadvantages of known hinge assemblies.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A hinge assembly for an electronic device comprises a first gear rotatable about a first axis of the hinge assembly and a second gear, rotatable about a second axis of the hinge assembly. A hinge housing holds the first gear in engagement with the second gear. A first hinge mounting element is configured to be movably fixed to a first leaf of the electronic device and a second hinge mounting element is configured to be movably fixed to a second leaf of the electronic device. A first pair of levers connects the first gear and the first hinge mounting element; and a second pair of levers connects the second gear and the second hinge mounting element.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Figure 1:
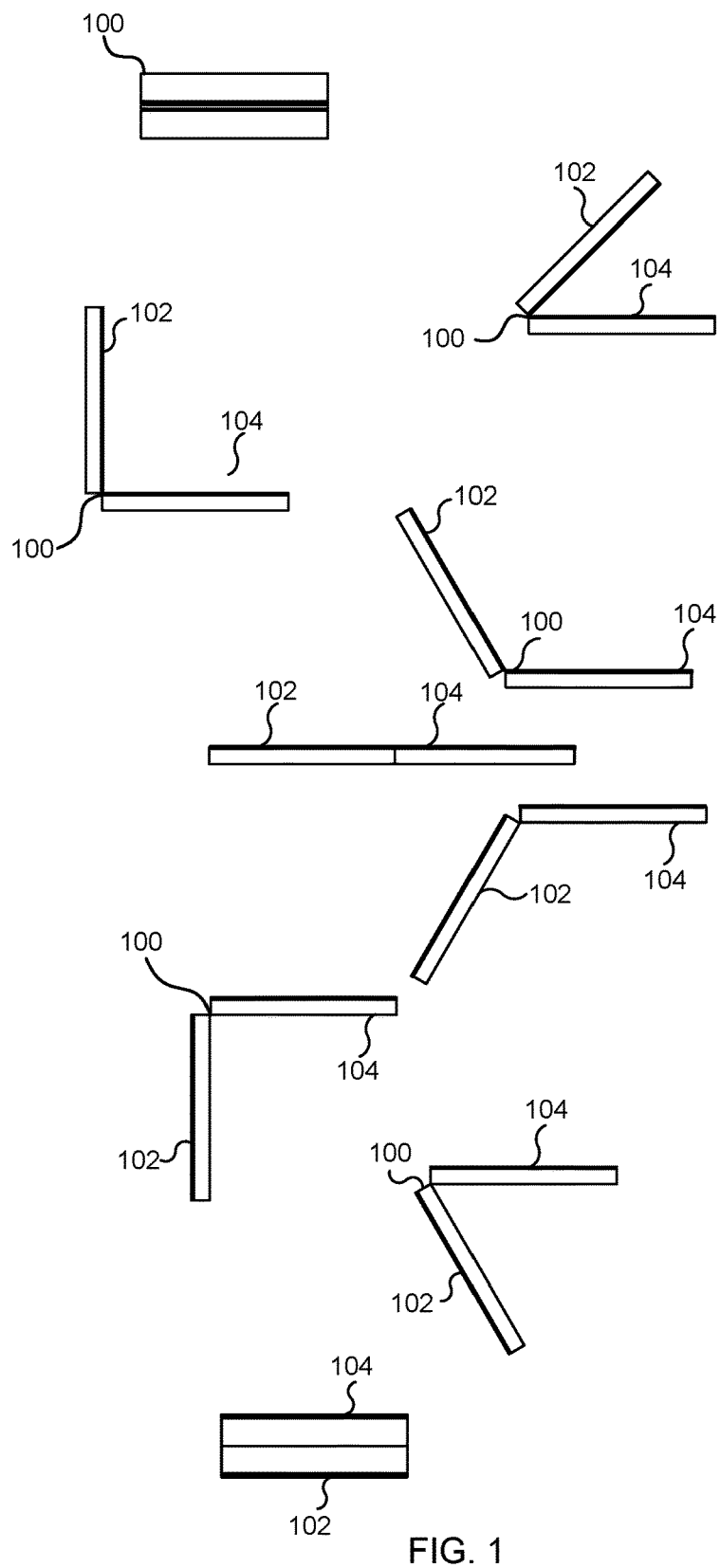
FIG. 1 is a side view of an electronic computing device in various configurations.

FIG. 1 is a side view of an electronic device with two leaves 102, 104 hinged together with one or more hinge assemblies 100. By virtue of the one or more hinge assemblies 100, the electronic device can be configured in at least a closed book type configuration, an open configuration in which the leaves 102, 104 of the device are substantially perpendicular, and a flat configuration where the leaves 102, 104 of the device are substantially 180 degrees apart. This is possible even where the profile of the electronic device is substantially rectangular as described in more detail below with reference to FIG. 1. The hinge assembly has a dual lever system which enables controlled movement of parts of the hinge assembly with respect to the leaves of the electronic device. In this manner a hinge mechanism is provided which gives smooth, controlled movement of the leaves 102, 104 of the electronic device and enables a user to easily change the configuration of the electronic device.

In some examples the hinge assembly enables rotation of the leaves of the device through substantially 360 degrees with respect to one another. However, this is not essential; the hinge assembly is arranged to limit rotation to less than 360 degrees in some cases by using one or more stops to limit rotation of gears in the hinge assembly or in other ways For example the hinge assembly enables rotation of the leaves of the device through substantially 180 degrees with respect to one another in some cases. The number of degrees through which the leaves of the electronic device may be rotated is referred to as a working range of the hinge assembly.

In some examples the electronic device is stable in positions intermediate along the working range so that a user can move the leaves of the electronic device to substantially any position within the working range and the leaves of the electronic device will be held in that position by the one or more hinge assemblies (that is, without the need for additional physical props). However, it is not essential for the hinge assembly to be stable in all positions along the working range.

The side views of FIG. 1 show hinge assembly 100 and leaves 102, 104 of the electronic device. In some examples each leaf 102, 104 of the electronic device comprises a housing holding electronic components and supporting a display screen; this gives a dual screen device. However, it is not essential to have a dual screen device and in some examples one of the leaves is a cover or lid without a display screen or electronic components and the other leaf has a display screen and electronic components. In some cases one leaf has an integral physical keyboard and the other leaf has a display screen.

Figure 2:
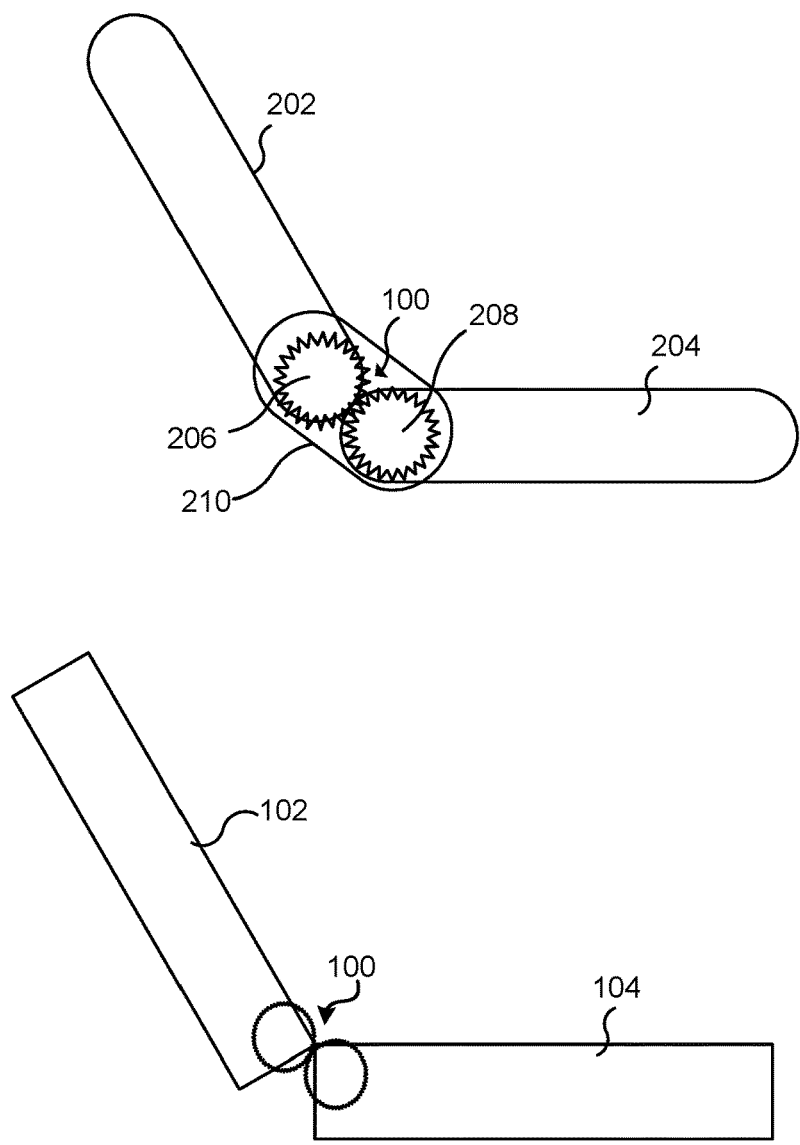
FIG. 2 is a side view of an electronic computing device with a rounded profile and of an electronic computing device with a rectangular profile.

As mentioned above, the hinge assemblies described herein are operable to give smooth controlled movement even where a profile of the leaves of the electronic device is substantially rectangular or substantially concave. The term "profile" is used to refer to the shape of the perimeter of an end face of the electronic device. FIG. 2 shows an example in the upper part of the figure where the leaves 202, 204 have a rounded profile and are joined by a hinge 100 comprising a pair of gears 206, 208. Each gear 206, 208 rotates about its center in relation to a hinge housing 210 and so the hinge is a dual axis hinge as there are two axes of rotation. The gears engage one another at a point of engagement because the profile is rounded and the gears have a bigger radius than a radius of the device profile.

The dual axis hinge 100 shown in the upper part of FIG. 2 is able to enable smooth rotation of the leaves with respect to one another without difficulty. In contrast, the lower part of FIG. 2 shows the situation for the same type of hinge where the profile of the leaves is rectangular. In this situation, as the user changes the configuration of the leaves the gears are forced to move with respect to the leaves and it is difficult to control this motion. Misalignment between the leaves occurs. The end result is an electronic device which is difficult to use in different configurations, tends to become "unstable" in certain configurations and is prone to damage as a result. For example, by undue force being applied by a user who finds it difficult to change the configuration of the device.

In various examples a hinge assembly has a dual lever system to facilitate controlled motion of the leaves of the device between configurations. A dual lever system is an arrangement of one or more pairs of levers.

Figure 3:
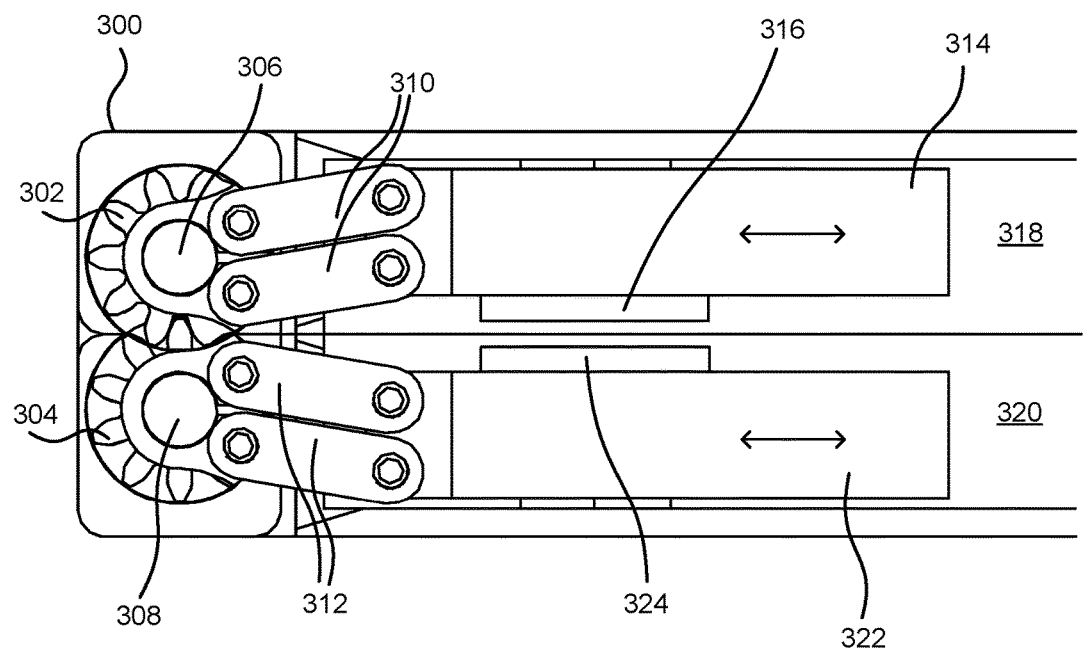
FIG. 3 is a side view of a hinge assembly in a closed configuration.

FIG. 3 shows an example of a dual lever system comprising two pairs of levers 310, 312. Each pair of levers 310, 312 is connected between a gear 302, 304 and a hinge mounting element 314, 322. Each hinge mounting element 314, 322 is movably connected to one of the leaves of the electronic device and is able to translate in a direction perpendicular to the axis of rotation of the associated gear. The direction of possible translation of the hinge mounting elements 314, 322 is indicated in FIG. 3 by arrows. The hinge mounting elements are held by being sandwiched between the head of a screw 324 and a housing of the leaf and this prevents the hinge mounting elements from rotating. Hinge mounting element 322 is movably connected to leaf 320 using any suitable connecting mechanism, such as screw 324 as explained in more detail later in this document. Hinge mounting element 314 is movably connected to leaf 318 using any suitable connecting mechanism such as screw 316. Each hinge mounting element 314, 322 is biased towards the leaf of the electronic device to which the hinge mounting element is attached. Any suitable biasing mechanism is used such as a coil spring, rubber element, leaf spring, or other biasing mechanism.

The hinge assembly of FIG. 3 comprises a hinge housing 300 holding two gears 302, 304 in engagement with one another. Each gear is mounted on a shaft and has an axis of rotation in its center. Gear 302 rotates about axis 306 and gear 304 rotates about axis 308. This gives a dual axis hinge. In FIG. 3 part of the hinge housing is cut away to show the gears and to show how the levers connect to the gears although in practice the hinge housing is closed to prevent ingress of dirt and moisture.

The hinge housing 300, together with its contents, is able to move with respect to the hinge mounting elements 314, 322 and thus with respect to the leaves of the electronic device since the hinge mounting elements 314, 322 are mounted on the leaves of the electronic device. The motion of the hinge housing 300 is controlled by the pairs of levers 310, 312 because each pair of levers 310, 312 connects between a respective gear (held in the hinge housing) and a respective hinge mounting element.

Figure 4:
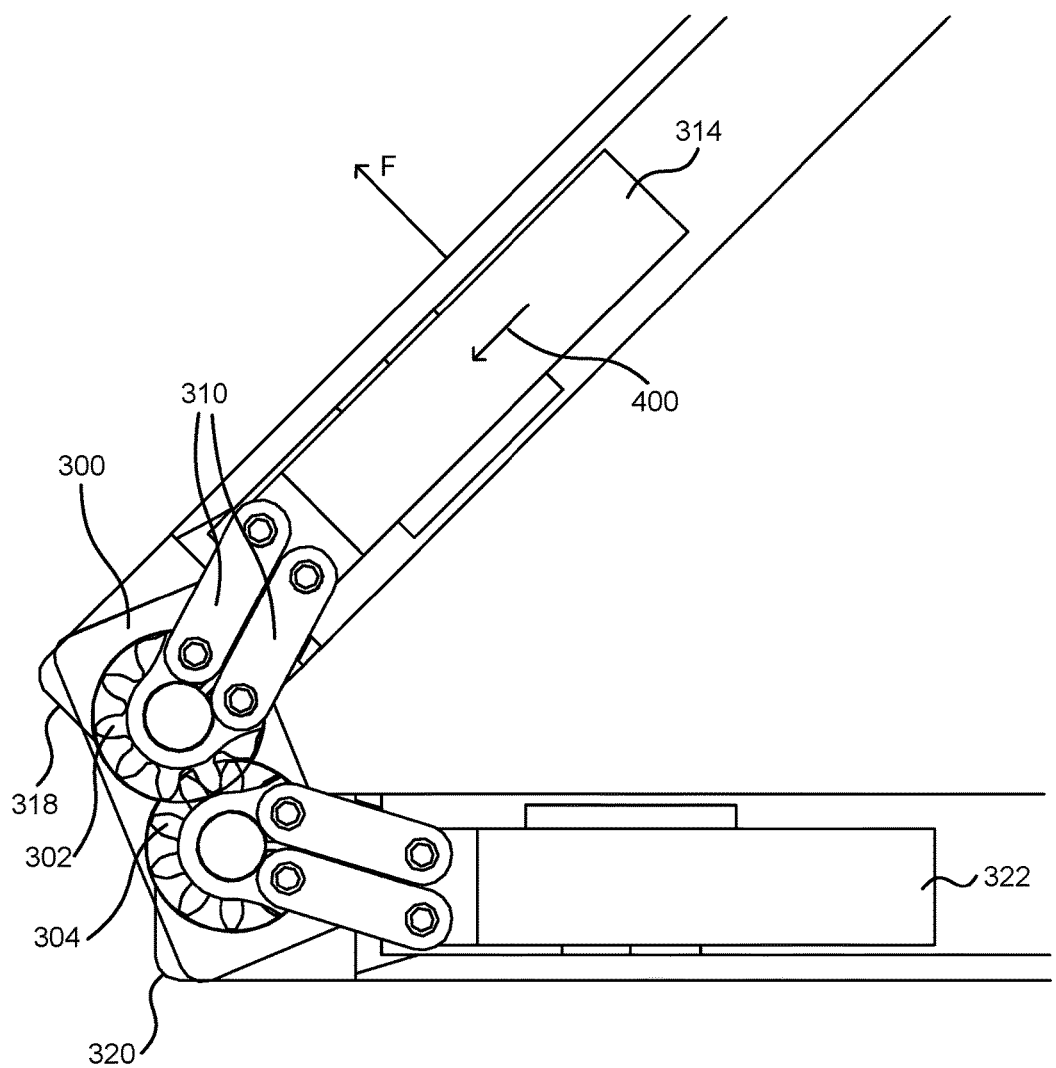
FIG. 4 is a side view of the hinge assembly of FIG. 3 in a configuration open at about 45 degrees.

During operation, the user moves leaf 318 upwards away from leaf 320 as illustrated in FIG. 4 in order to open the electronic device. The force (see arrow F in FIG. 4) the user applies to the leaf 320 causes the gear 302 to rotate anti-clockwise and the gear 304 to rotate clockwise in relation to the hinge housing 300. The ends of each leaf which are near the hinge assembly have a rectangular profile in the example of FIG. 4 and pivot against each other. This is not visible in FIG. 4 as the hinge housing 300 is depicted uppermost. As a result, the hinge housing 300 moves from the vertical position of FIG. 3 to a position in which it is at about 25 degrees from vertical as illustrated in FIG. 4. Because the hinge housing is held onto the leaves of the device via the dual levers and the hinge mounting elements, the motion of the hinge housing 300 is controlled so that the rotational position of the gears is fixed in relation to the leaves of the device. As the hinge housing moves into the position indicated in FIG. 4 from the configuration of FIG. 3, the levers 310 pull hinge mounting element 314 towards hinge housing 300 as indicated by arrow 400.

Figure 5:
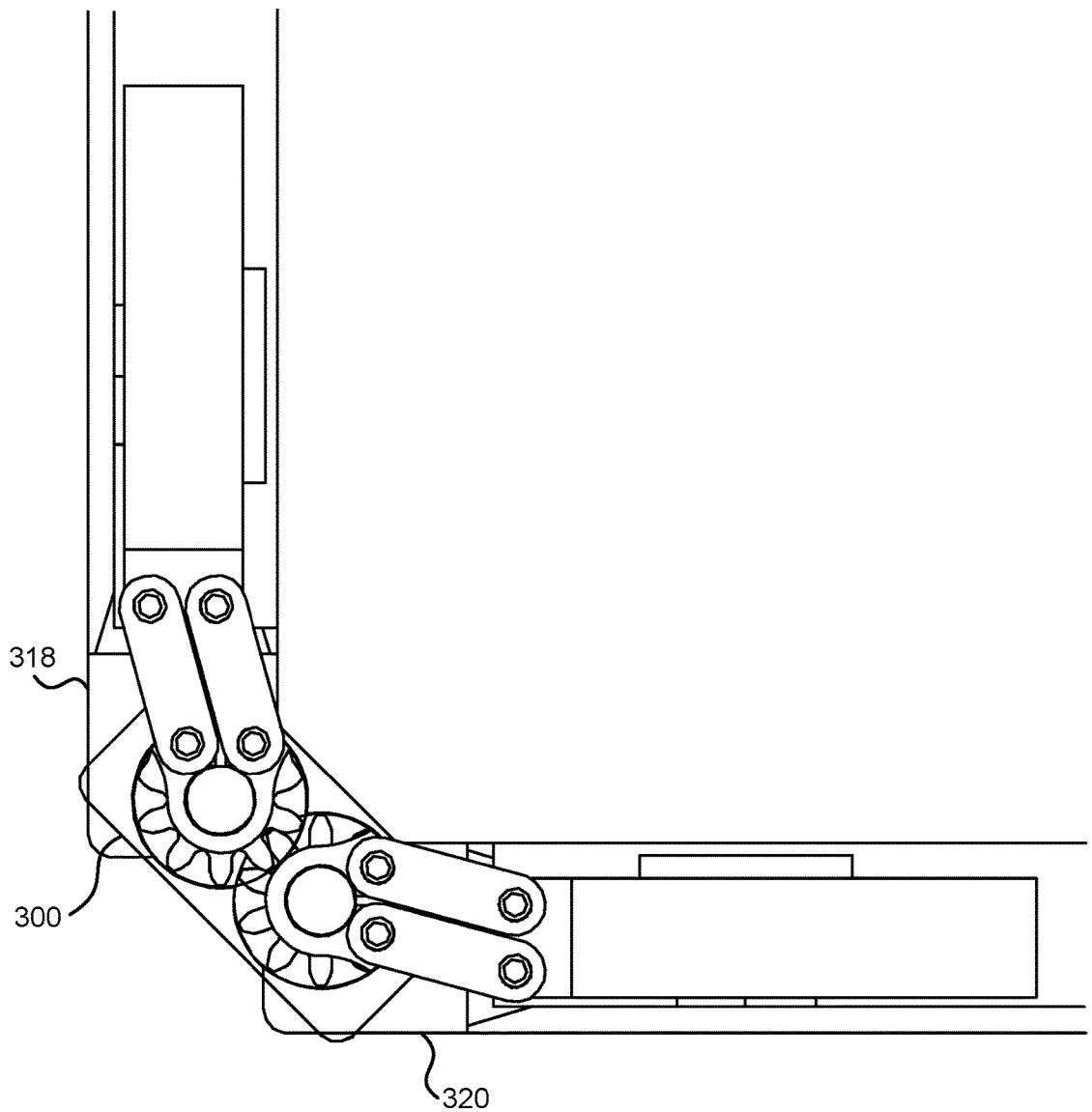
FIG. 5 is a side view of the hinge assembly of FIG. 3 in a configuration open at about 90 degrees.

FIG. 5 shows the situation where the user has continued to open the electronic device into a position where the leaves are substantially 90 degrees apart. Here the hinge housing is about 45 degrees from vertical and the substantially rectangular profile of the ends of the leaves of the computing device nearest the hinge assembly is visible.

Figure 6:
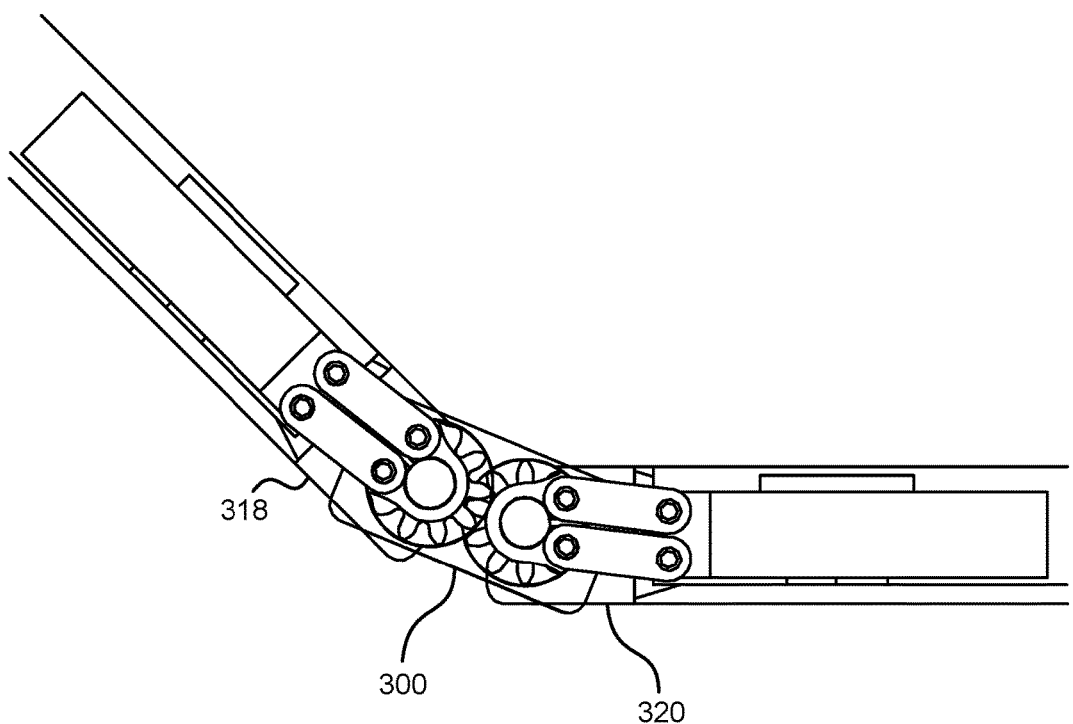
FIG. 6 is a side view of the hinge assembly of FIG. 3 in a configuration open at about 135 degrees.
Figure 7:
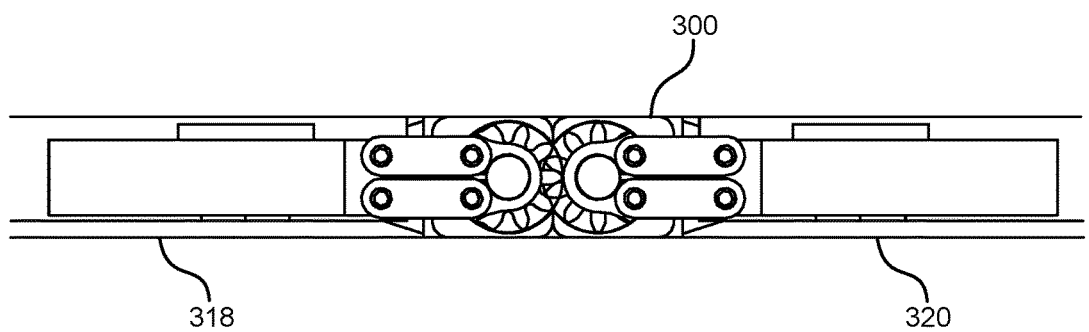
FIG. 7 is a side view of the hinge assembly of FIG. 3 in a configuration open at 180 degrees.

FIG. 6 shows the situation where the user has continued to open the electronic device into a position where the leaves are substantially 135 degrees apart. FIG. 7 shows the situation where the user has continued to open the electronic device into a position where the leaves are substantially 180 degrees apart.

In the examples of FIGS. 3 to 7 the hinge assembly is illustrated with two gears and one pair of levers per gear. However, it is also possible for each gear to have two pairs of levers, one on each side of the gear. In other examples, there are two pairs of gears arranged side by side in a block and four pairs of levers (two pairs on each side of the block of gears). In other examples there are four gears and eight pairs of levers, with two pairs of levers on each side of each pair of gears. The particular number of pairs of gears and pairs of levers used depends on factors such as the relative weight of the two leaves of the electronic device, the materials used to construct the hinge assembly and leaves, the working range of the hinge assembly, the space available and others.

Figure 8:
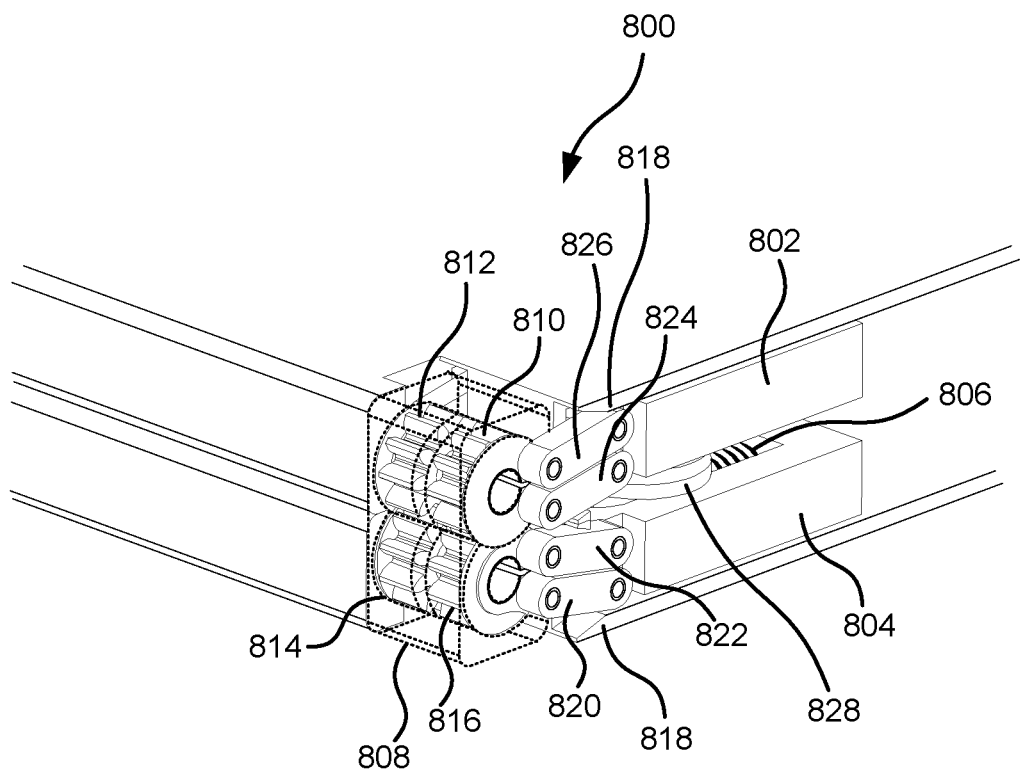
FIG. 8 is a perspective view of another hinge assembly with two pairs of gears and with the hinge housing shown as transparent.

FIG. 8 is a perspective view of another dual axis hinge assembly 800 with two pairs of gears (a first pair 810, 816 and a second pair 814, 812) and with the hinge housing 808 shown as transparent. In this view two pairs of levers are visible, a first pair comprising levers 820, 822 and a second pair comprising levers 824, 826. Two more pairs of levers are attached to the second pair of gears although these two further pairs of levers are not visible in FIG. 8 due to their location. Each pair of levers is connected between a gear and a hinge mounting element. In FIG. 8 two hinge mounting elements are visible 802, 804. It is possible to use two further hinge mounting elements (for the second pair of gears) or to have the pairs of levers of the second pair of gears connect to the same hinge mounting elements as for the first pair of gears.

As mentioned above, each hinge mounting element is movably connected to one of the leaves of the electronic device. FIG. 8 shows an example of this being achieved using screws (the heads 828 of which are visible in FIG. 8). FIG. 8 also shows part of coil spring 806 in hinge mounting element 804 which acts to push the hinge mounting element 804 and thus the levers and the hinge housing towards the leaves 318, 320. The spring is loaded between the hinge mounting element and a screw boss which is fixed to a leaf. Since the lever pairs are connected to the hinge mounting element and hinge housing the force generated by the spring acts to pull the hinge housing towards the leaves. In this way the leaves and hinge housing are pulled together by the springs. In some examples the coil spring 806 is located on the other side of screw 828. In some examples, another type of biasing mechanism is used such as a rubber element, leaf spring or other biasing mechanism.

FIG. 8 also shows wedge shaped edges 818 on the leaves of the electronic device. Each wedge shaped edge 818 guides and facilitates movement of a pair of levers into a housing of the leaf of the electronic device holding the hinge mounting element that the lever pair is connected to. The ends of two wedge shaped guide elements 830 are also visible in FIG. 8 and these elements serve the same purpose as the wedge shaped edge guides 818.

Figure 9:
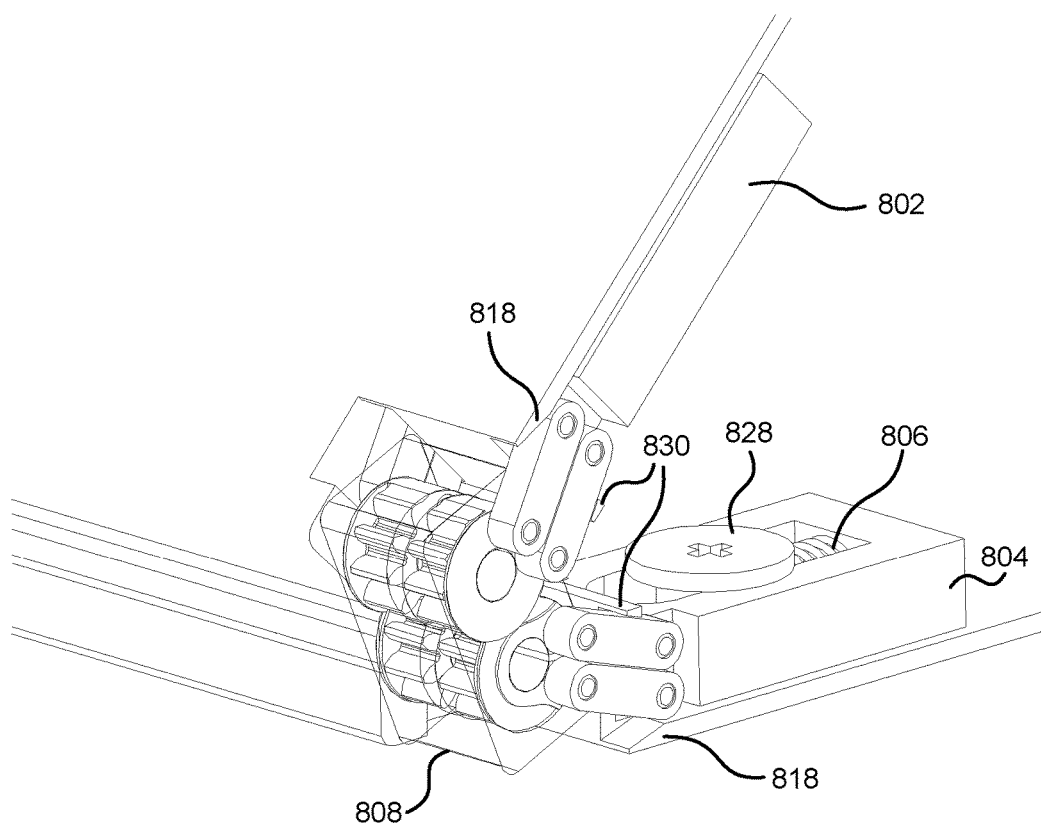
FIG. 9 is a perspective view of the hinge assembly of FIG. 8 open at about 45 degrees.
Figure 10:
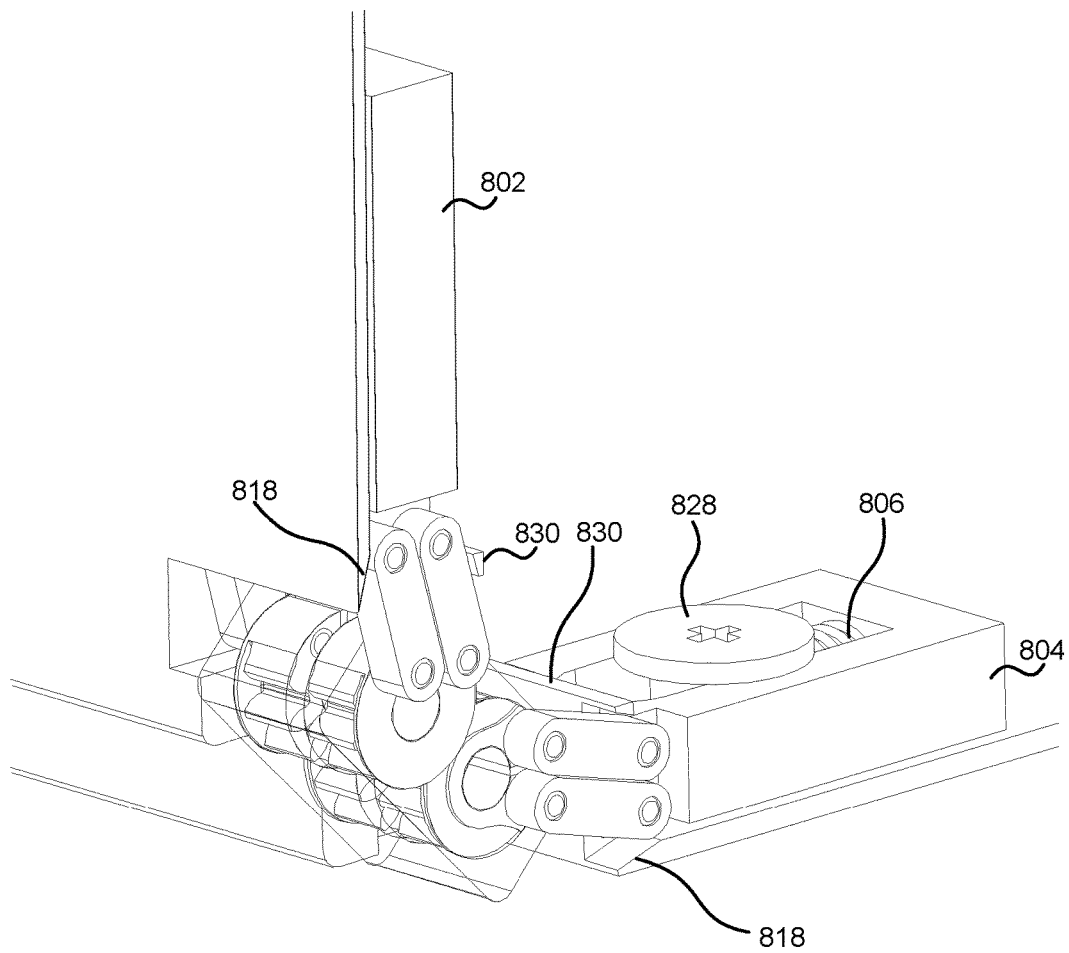
FIG. 10 is a perspective view of the hinge assembly of FIG. 8 open at about 90 degrees.
Figure 11:
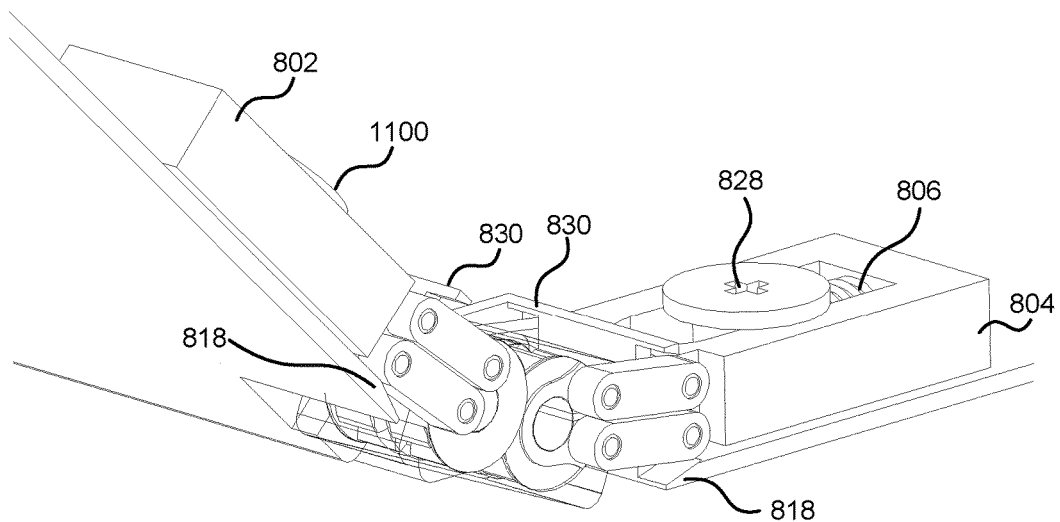
FIG. 11 is a perspective view of the hinge assembly of FIG. 8 open at about 135 degrees.
Figure 12:
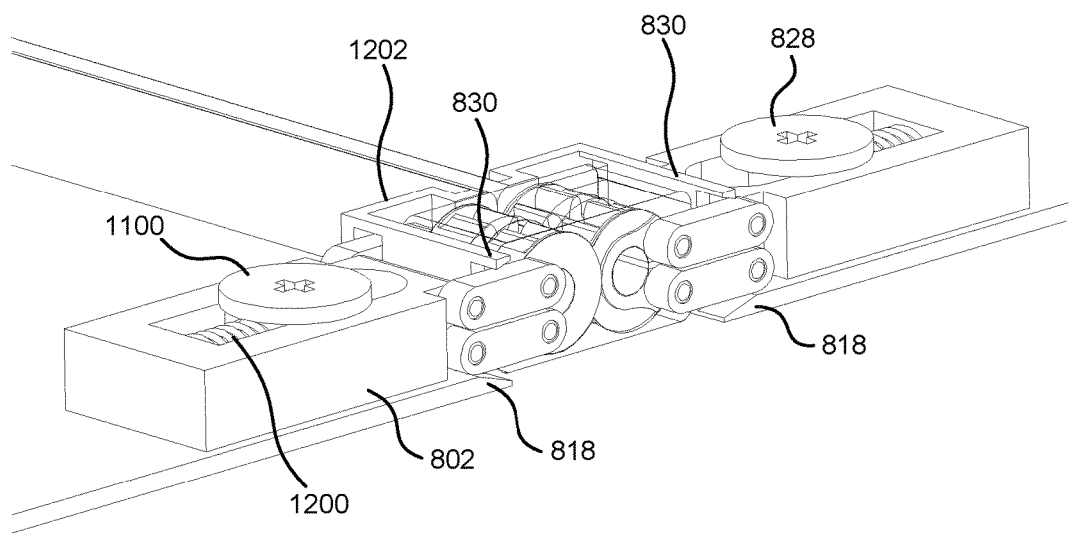
FIG. 12 is a perspective view of the hinge assembly of FIG. 8 open at 180 degrees.

FIG. 9 shows the example of FIG. 8 and where the leaves of the electronic device are substantially 45 degrees apart. In the view of FIG. 9 the wedge shaped edge guides 818 and wedge shaped guide elements 830 are shown in more detail. FIG. 10 shows the example of FIG. 9 and where the leaves of the electronic device are substantially 90 degrees apart. In FIG. 9 it is seen that the wedge shaped guide element 830 of the hinge mounting element 804 is an arm which is has a wedge shaped profile at the end which is configured to contact the levers. FIG. 10 shows this in more detail as the leaves of the device are now even further apart as compared with FIG. 9. In FIG. 10 head of screw 1100 of hinge mounting element 802 is visible. In FIG. 11 the wedge shaped edge guides 818 and wedge shaped guide elements 830 are shown in more detail. In FIG. 12 the wedge shaped guide elements 830 are clearly shown as part of a structure sitting around the hinge housing (where the hinge housing is transparent in FIG. 12 to show the gears). This structure is referred to as a lever guide structure 1202 and it is fixed to the leaves of the electronic device such as by being integral with walls of a housing of the leaf of the electronic device which form a recess in which the hinge housing is located. The configuration of FIG. 12 in which the leaves of the electronic device are substantially 180 degrees apart shows the coil spring 1200 of the hinge mounting element 802.

Figure 13:
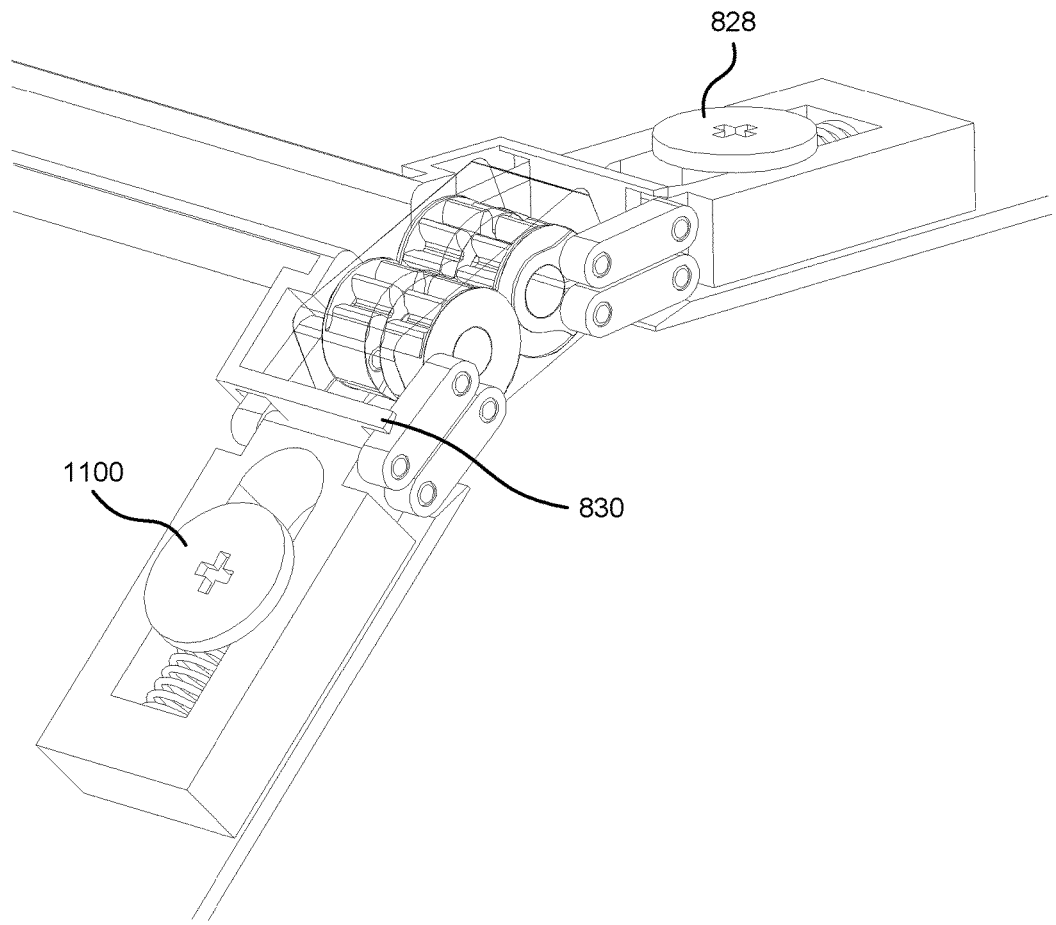
FIG. 13 is a perspective view of the hinge assembly of FIG. 8 open at about 225 degrees.
Figure 14:
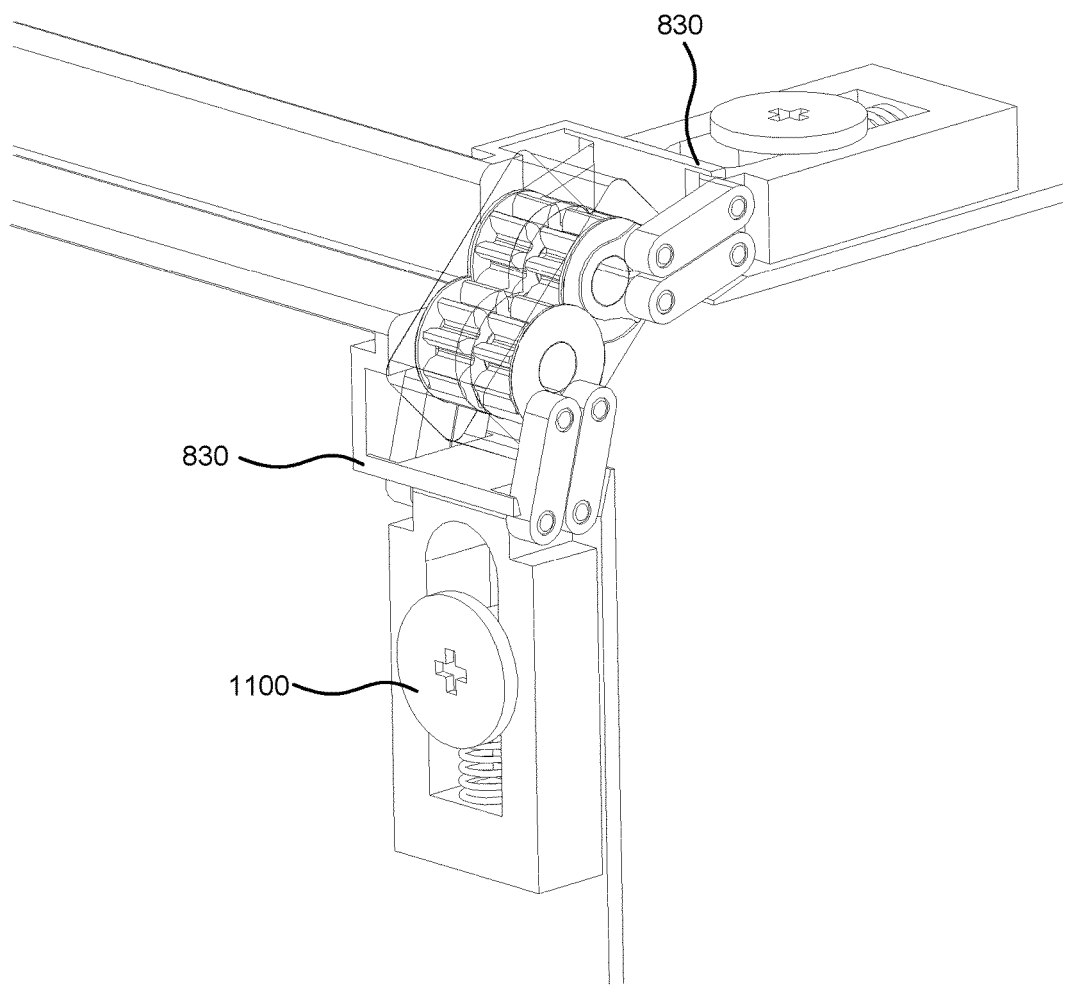
FIG. 14 is a perspective view of the hinge assembly of FIG. 8 open at about 270 degrees.
Figure 15:
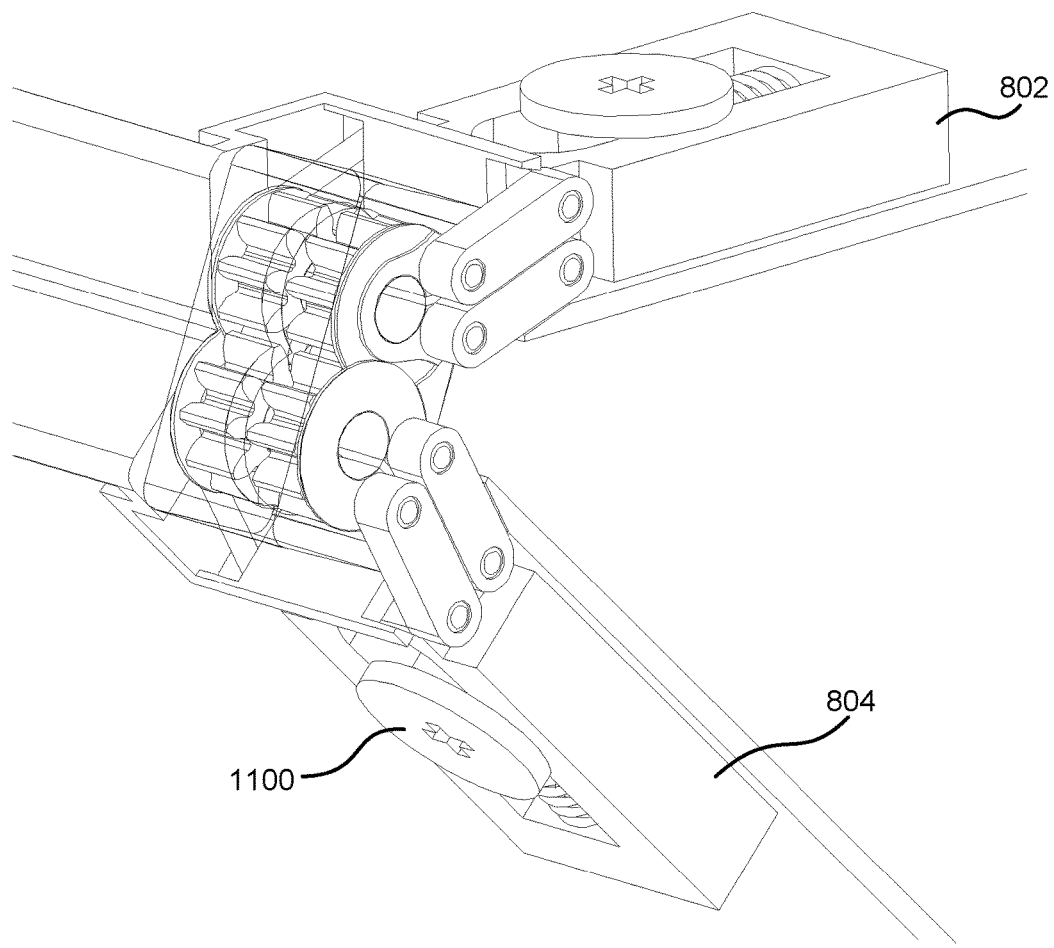
FIG. 15 is a perspective view of the hinge assembly of FIG. 8 open at about 315 degrees.
Figure 16:
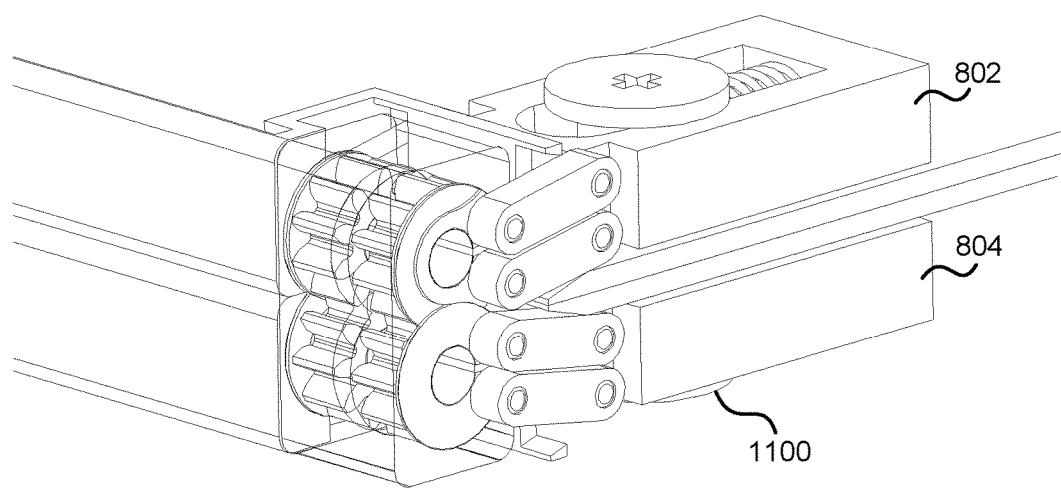
FIG. 16 is a perspective view of the hinge assembly of FIG. 8 open at about 360 degrees.

FIG. 13 shows a configuration in which the leaves of the electronic device are substantially 225 degrees apart. FIG. 14 shows a configuration in which the leaves of the electronic device are substantially 270 degrees apart and in which wedge shaped guide element 830 is visible. FIG. 15 shows a configuration in which the leaves of the electronic device are substantially 315 degrees apart. FIG. 16 is a perspective view of the dual axis hinge assembly of FIG. 8 open at substantially 360 degrees and the pairs of levers are shown in use guiding motion of the hinge housing.

Figure 17:
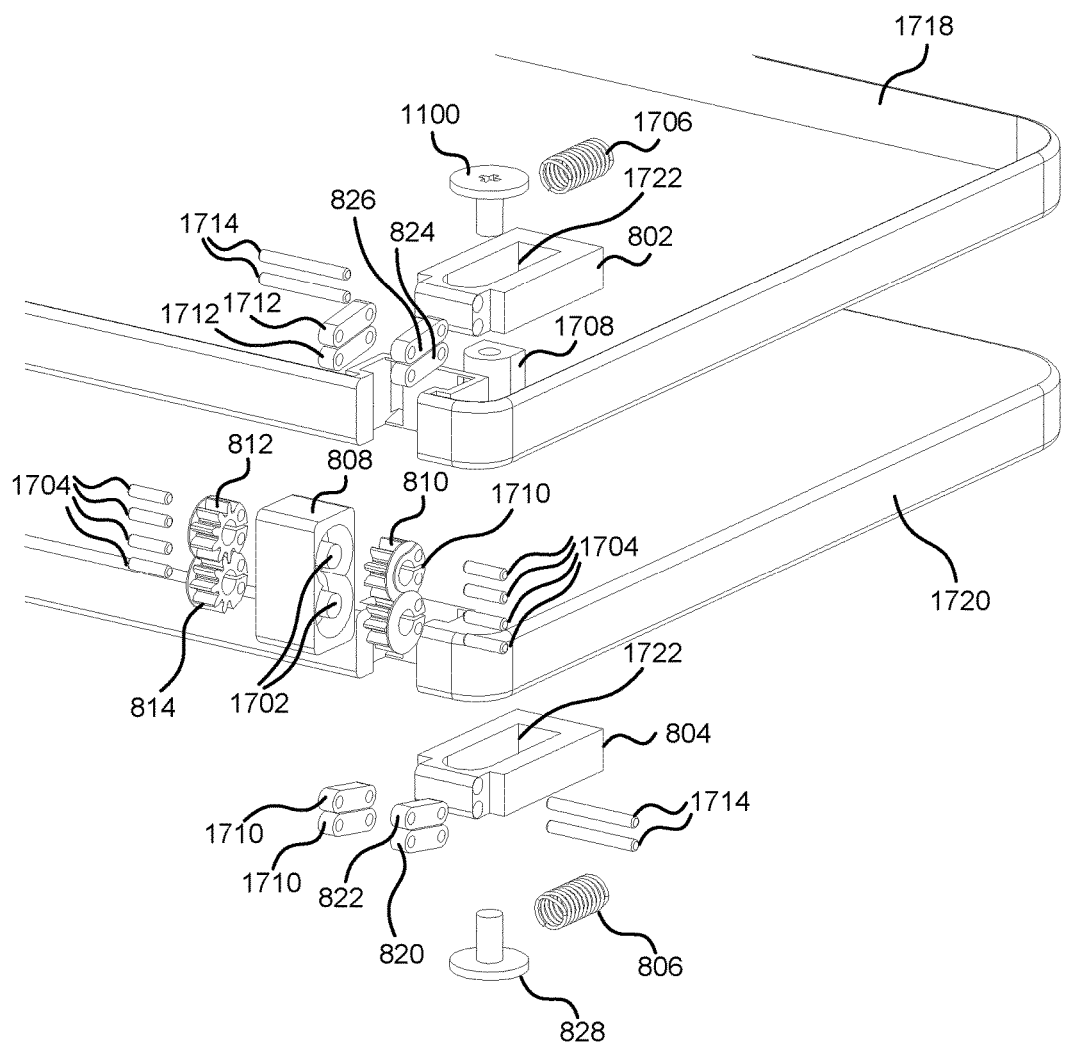
FIG. 17 is an exploded view of the hinge assembly of FIGS. 8 to 16.

FIG. 17 is an exploded view of the hinge assembly of FIGS. 8 to 16. It comprises two pairs of gears 810, 816 and 812, 814, as well as two hinge mounting elements 802, 804 one for each leaf of the electronic device. There are four pairs of levers 1712, (824, 826), 1710, (820, 822). Each gear has a split 1710 which enables the gear to be press fit onto one of the shafts 1702 in the hinge housing 808. This provides friction between each gear and the shaft 1702 it is mounted on so that the leaves of the device are stable in configurations where one or both of the leaves are unsupported by another surface such as a table, or the other leaf of the electronic device. Each gear has a pair of pin holes, each pin hole configured to receive an end of a pin 1704 where the other end of the pin is received by a pin hole of a lever 1710, 820, 822. In this way the levers are connected to the gears by pins 1704. In this example, the levers are connected to the hinge mounting elements using pins 1714 which enter pin holes of the levers at one end and enter pin holes of the hinge mounting elements at a second end. As shown in FIG. 17, in this example, the levers within a pair of levers are substantially the same length and are configured to be positioned adjacent to one another along a longitudinal length of the levers.

FIG. 17 shows part of a housing of a first leaf 1718 of the electronic device and part of a housing of a second leaf 1720 of the electronic device. A recess is formed in each of these housings 1718, 1720 to hold the hinge housing 808 and through which the pairs of levers are able extend and connect to the respective hinge mounting elements 802, 804. The lever guide structure 1202 is not visible in FIG. 17.

FIG. 17 has more detail about how a hinge mounting element is movably connected to a leaf of the electronic device in some examples. Each hinge mounting element comprises a slot 1722 configured to fit about a fixed element 1708 which is fixed to the housing of the leaf of the electronic device and has a screw hole configured to receive screw 1100. The screw is sized and shaped such that there is a clearance between the screw and the hinge mounting element 802 that enables the hinge mounting element to translate in a direction substantially perpendicular to the axes of rotation of the gears. During this translation the slot of the hinge mounting element moves against the fixed element 1708. The fixed element 1708 has a flat face configured to abut the end of coil spring 1706 when the coil spring is inserted into the slot of the hinge mounting element 802. The coil spring 1706 acts to press the hinge mounting element 802 towards the gears. The other leaf of the electronic device also has a fixed element 1708 although it is not visible in FIG. 17.

The components of the hinge assembly are made of plastic or metal.

Figure 18:
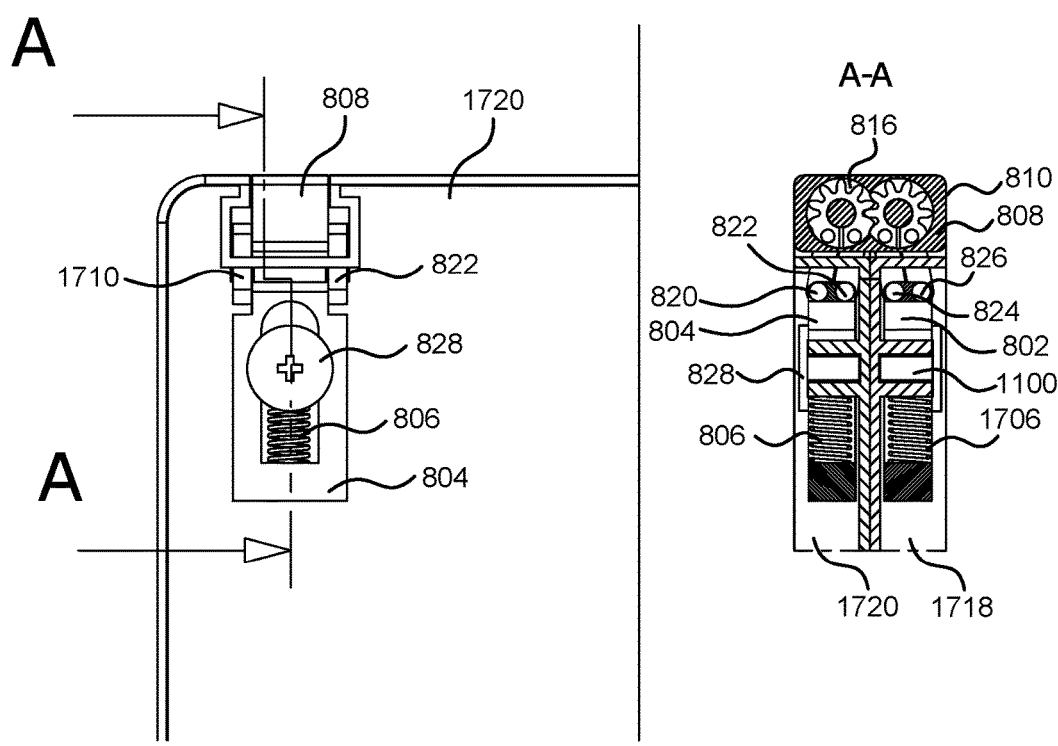
FIG. 18 is a plan view of part of a hinge assembly and a cross section through the part of the hinge assembly.

FIG. 18 is a plan view of part of a dual axis hinge assembly and a cross section through the part of the dual axis hinge assembly. The electronic device is in a closed configuration. Only one leaf is visible in the view on the left hand side of FIG. 18. The other leaf is not visible in FIG. 18 on the left hand side because the device is in the closed configuration. Referring to the left hand side of FIG. 18, leaf 1720 of the electronic device is shown having a recess holding a hinge housing 808 and with levers 1710, 822 extending through a wall of the recess and being connected to hinge mounting element 804. The hinge mounting element contains coil spring 806 which abuts a fixed element (not shown) into which screw 828 is inserted. A cross section taken along line A-A is given on the right hand side of FIG. 18. The cross section shows both leaves of the electronic device as the device is in a closed configuration.

The cross section shows the hinge housing 808 comprising gears 816 and 810. The splits in the gears are visible as are the pin holes used to connect the levers to the gears. The ends of gears 820, 822, 824, 826 extend out of the hinge housing 808 and connect to the hinge mounting elements 804, 802. The coil springs 806, 1706 in the hinge mounting elements are visible.

Alternatively or in addition to the other examples described herein, examples include any combination of the following:

A hinge assembly for an electronic device the hinge assembly comprising:

a first gear rotatable about a first axis of the hinge assembly and a second gear, rotatable about a second axis of the hinge assembly;

a hinge housing holding the first gear in engagement with the second gear;

a first hinge mounting element configured to be movably fixed to a first leaf of the electronic device;

a second hinge mounting element configured to be movably fixed to a second leaf of the electronic device;

a first pair of levers connecting the first gear and the first hinge mounting element; and a second pair of levers connecting the second gear and the second hinge mounting element.

The hinge assembly described above wherein the hinge housing is moveable with respect to the leaves of the electronic device and wherein the pairs of levers control the movement of the hinge housing.

The hinge assembly described above wherein the hinge housing is moveable with respect to the leaves of the electronic device and wherein the pairs of levers control the motion of the hinge housing so that the rotational position of the gears is fixed in relation to the leaves of the device.

The hinge assembly described above wherein each hinge mounting element comprises a biasing mechanism configured to bias the associated hinge mounting element towards the gears.

The hinge assembly described above wherein at least one of the biasing mechanisms comprises a coil spring held within a slot in the associated hinge mounting element and abutting a fixed element configured to be fixed to a leaf of the electronic device.

The hinge assembly described above wherein each hinge mounting element comprises a slot configured to fit about a fixed element fixed to a leaf of the electronic device such that the slot is able to slide against the fixed element.

The hinge assembly described above wherein the hinge mounting element is held to the associated leaf of the electronic device by a screw the head of which is unable to pass through the slot and the shaft of which passes through the slot into the fixed element.

The hinge assembly described above wherein the screw is sized and shaped to give a clearance between the head of the screw and the hinge mounting element such that the hinge mounting element is able to move against the fixed element in use.

The hinge assembly described above wherein the gears are press fit into the hinge housing such that friction between the gears is achieved during operation of the hinge assembly.

The hinge assembly described above wherein each gear comprises a slot configured to facilitate the press fit.

The hinge assembly described above wherein the hinge housing comprises holes through which ends of the pairs of levers extend for connection to the hinge mounting elements.

The hinge assembly of described above wherein each gear comprises a pair of pin holes configured to receive pins which connect a pair of levers to the gear.

The hinge assembly of described above wherein the pairs of levers are such that each lever in a given pair of levers is the same length.

The hinge assembly of described above wherein the levers of each pair of levers are adjacent to one another along the longitudinal lengths of the levers.

The hinge assembly of described above comprising at least one wedge shaped guide element comprising an arm with a wedge shaped profile at its end which is configured to contact at least one of the levers.

An electronic device having two leaves hinged together with at least one hinge assembly as described above.

The electronic device described above wherein each leaf of the electronic device has an edge which is hinged to the other leaf of the electronic device using the hinge assembly, and wherein said edges have a substantially concave or a substantially rectangular profile.

The electronic device described above wherein at least one of the leaves of the electronic device comprises a housing having a wedge shaped edge positioned so as to meet one of the pairs of levers during operation of the hinge assembly.

The electronic device described above wherein each leaf of the electronic device has a recess sized and shaped to receive at least part of the hinge housing.

The electronic device described above wherein each leaf of the electronic device has a fixed post being the fixed element against which a slot of one of the hinge mounting elements is able to move.

A hinge assembly for an electronic device, the hinge assembly comprising:

a first gear rotatable about a first axis of the hinge assembly and a second gear, rotatable about a second axis of the hinge assembly;

a hinge housing holding the first gear in engagement with the second gear;

a first hinge mounting element configured to be movably fixed to a first leaf of the electronic device;
a second hinge mounting element configured to be movably fixed to a second leaf of the electronic device;
a first pair of levers connecting the first gear and the first hinge mounting element; and
a second pair of levers connecting the second gear and the second hinge mounting element; such that in use motion of the hinge housing is controlled by the pairs of levers.

A hinge assembly for an electronic device the hinge assembly comprising:
a first gear rotatable about a first axis of the hinge assembly and a second gear, rotatable about a second axis of the hinge assembly;
a hinge housing holding the first gear in engagement with the second gear;
a first hinge mounting element configured to be movably fixed to a first leaf of the electronic device;
a second hinge mounting element configured to be movably fixed to a second leaf of the electronic device;
means for connecting the first gear and the first hinge mounting element; and means for connecting the second gear and the second hinge mounting element.

For example, the means for connecting is a pair of levers or any other suitable structure known to the skilled person.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term 'comprising' is used herein to mean including the elements identified, but that such elements do not comprise an exclusive list and an apparatus may contain additional elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A hinge assembly for an electronic device, the hinge assembly comprising:
a first gear rotatable about a first axis of the hinge assembly and a second gear, rotatable about a second axis of the hinge assembly;
a hinge housing holding the first gear in engagement with the second gear;
a first hinge mounting element configured to be movably fixed to a first leaf of the electronic device;
a second hinge mounting element configured to be movably fixed to a second leaf of the electronic device;
a first pair of levers connecting the first gear and the first hinge mounting element; and
a second pair of levers connecting the second gear and the second hinge mounting element; and
wherein the hinge housing is moveable with respect to the first leaf and the second leaf, and wherein the first pair of levers and the second pair of levers control movement of the hinge housing.

2. The hinge assembly of claim 1 wherein the pairs of levers control the motion of the hinge housing so that the rotational position of the gears is fixed in relation to the leaves of the device.

3. The hinge assembly of claim 1 wherein each hinge mounting element comprises a biasing mechanism configured to bias the associated hinge mounting element towards the gears.

4. The hinge assembly of claim 3 wherein at least one of the biasing mechanisms comprises a coil spring held within a slot in the associated hinge mounting element and abutting a fixed element configured to be fixed to one of the leaves of the electronic device.

5. The hinge assembly of claim 1 wherein each hinge mounting element comprises a slot configured to fit about a fixed element fixed to one of the leaves of the electronic device such that the slot is able to slide against the fixed element.

6. The hinge assembly of claim 5 wherein the hinge mounting element is held to the associated leaf of the electronic device by a screw the head of which is unable to pass through the slot and the shaft of which passes through the slot into the fixed element.

7. The hinge assembly of claim 6 wherein the screw is sized and shaped to give a clearance between the head of the screw and the hinge mounting element such that the hinge mounting element is able to move against the fixed element.

8. The hinge assembly of claim 1 wherein the gears are press fit into the hinge housing such that friction between the gears is achieved during operation of the hinge assembly.

9. The hinge assembly of claim 8 wherein each gear comprises a slot configured to facilitate the press fit.

10. The hinge assembly of claim 1 wherein the hinge housing comprises holes through which ends of the pairs of levers extend for connection to the hinge mounting elements.

11. The hinge assembly of claim 1 wherein each gear comprises a pair of pin holes configured to receive pins which connect the pair of levers to the gear.

12. The hinge assembly of claim 1 wherein the pairs of levers are such that each lever in a given pair of levers is the same length.

13. The hinge assembly of claim 1 wherein the levers of each pair of levers are adjacent to one another along the longitudinal lengths of the levers.

14. The hinge assembly of claim 1 comprising at least one wedge shaped guide element comprising an arm with a wedge shaped profile at its end which is configured to contact at least one of the levers.

15. The electronic device of claim 1 having its two leaves hinged together with at least one said hinge assembly.

16. The electronic device of claim 15 wherein each leaf of the electronic device has an edge which is hinged to the other leaf of the electronic device using the hinge assembly, and wherein said edges have a substantially concave or a substantially rectangular profile.

17. The electronic device of claim 15 wherein at least one of the leaves of the electronic device comprises a housing having a wedge shaped edge positioned so as to meet one of the pairs of levers during operation of the hinge assembly.

18. The electronic device of claim 15 wherein each leaf of the electronic device has a recess sized and shaped to receive at least part of the hinge housing.

19. A hinge assembly for an electronic device, the hinge assembly comprising:
   a first gear rotatable about a first axis of the hinge assembly and a second gear, rotatable about a second axis of the hinge assembly;
   a hinge housing holding the first gear in engagement with the second gear;
   a first hinge mounting element configured to be movably fixed to a first leaf of the electronic device;
   a second hinge mounting element configured to be movably fixed to a second leaf of the electronic device;
   a first pair of levers connecting the first gear and the first hinge mounting element; and
   a second pair of levers connecting the second gear and the second hinge mounting element; such that a motion of the hinge housing is controlled by the pairs of levers.

20. The hinge assembly of claim 19, wherein each hinge mounting element comprises a biasing mechanism configured to bias the associated hinge mounting element towards the gears.

* * * * *